US008184579B2

(12) United States Patent
Shen et al.

(10) Patent No.: US 8,184,579 B2
(45) Date of Patent: May 22, 2012

(54) ACK/NAK REPETITION SCHEMES IN WIRELESS NETWORKS

(75) Inventors: Zukang Shen, Richardson, TX (US); Tarik Muharemovic, Dallas, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 582 days.

(21) Appl. No.: 12/369,583

(22) Filed: Feb. 11, 2009

(65) Prior Publication Data

US 2009/0207793 A1 Aug. 20, 2009

Related U.S. Application Data

(60) Provisional application No. 61/028,948, filed on Feb. 15, 2008, provisional application No. 61/034,235, filed on Mar. 6, 2008, provisional application No. 61/096,059, filed on Sep. 11, 2008.

(51) Int. Cl.
*H04W 4/00* (2009.01)

(52) U.S. Cl. ........................................ 370/329; 370/465

(58) Field of Classification Search .......... 370/328–329, 370/335–336, 341–342, 345, 348, 395.4, 370/395.41, 437, 441–443, 465, 468
See application file for complete search history.

(56) References Cited

U.S. PATENT DOCUMENTS

| | | | | |
|---|---|---|---|---|
| 7,929,962 | B2 * | 4/2011 | Bachl et al. | 455/424 |
| 7,995,615 | B2 * | 8/2011 | Yang et al. | 370/479 |
| 2008/0013610 | A1 * | 1/2008 | Varadarajan et al. | 375/221 |
| 2008/0069031 | A1 * | 3/2008 | Zhang et al. | 370/328 |
| 2008/0212615 | A1 * | 9/2008 | Ranta-Aho et al. | 370/498 |
| 2009/0122736 | A1 * | 5/2009 | Damnjanovic et al. | 370/311 |

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS 36.211, Release 8, V8.4.0, Valbonne, France, Sep. 2008, pp. 1-80.

* cited by examiner

*Primary Examiner* — Chi H. Pham
*Assistant Examiner* — Kevin Mew
(74) *Attorney, Agent, or Firm* — Robert D. Marshall, Jr.; Wade James Brady, III; Frederick J. Telecky, Jr.

(57) ABSTRACT

ACK/NAK repetition may be necessary to provide sufficient coverage for cell edge UEs. For a coverage limited UE, a NodeB may inform the UE that ACK/NAK repetition is needed. Such information can be explicitly signaled to the UE via DL control channels or conveyed through higher layer signaling. Further, a specific resource for ACK/NAK repetition and the number of repeated transmissions of ACK/NAK are further signaled to the UE.

9 Claims, 6 Drawing Sheets

ACK/NAK REPETITION SCHEMES IN WIRELESS NETWORKS

CLAIM OF PRIORITY UNDER 35 U.S.C. 119(e)

The present application claims priority to and incorporates by reference U.S. Provisional Application No. 61/028,948, filed Feb. 15, 2008, entitled "Support of ACK/NAK Repetition in Uplink." The present application also claims priority to and incorporates by reference U.S. Provisional Application No. 61/034,235 filed Mar. 6, 2008, entitled "Support of ACK/NAK Repetition in Uplink." The present application also claims priority to and incorporates by reference U.S. Provisional Application No. 61/096,059, filed Sep. 11, 2008, entitled "Support of ACK/NAK Repetition in Uplink."

FIELD OF THE INVENTION

This invention generally relates to wireless cellular communication, and in particular to transmission of feedback information in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. Here, ACK refers to acknowledgement (successful CRC check) and NACK refers to negative-acknowledgement (failed CRC check). The ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of semi-persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "3rd Generation Partnership Project; Technical Specification Group Radio Access Network; Evolved Universal Terrestrial Radio Access (E-UTRA); Physical Channels and Modulation (Release 8)." (3GPP TS 36.211)

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

ACK/NAK repetition may be necessary to provide sufficient coverage for cell edge UEs. In 3GPP LTE, for dynamically scheduled UEs, the ACK/NAK resource is linked to the downlink (DL) Channel Control Elements (CCE) index. For persistently scheduled ACK/NAK UEs, the ACK/NAK resource is explicitly signaled to the UE. In this disclosure, methods to enable ACK/NAK repetition will be described.

Throughout this document, it is assumed that ACK/NAK repetition factor is N. The repeated transmission of the ACK/NAK bits can be in the consecutive (N−1) subframes following the first transmission of the ACK/NAK bits. Alternatively, the repeated ACK/NAK bits can be transmitted in non-consecutive subframes after the first transmission of ACK/NAK bits.

For coverage limited UEs, a NodeB may inform the UE that ACK/NAK repetition is needed. Such information can be explicitly signaled to UEs via UE-specific DL control channels or conveyed through higher layer signaling, e.g. RRC signaling. Alternatively, the UE can derive whether ACK/NAK repetition is needed or not, based on its own measurements of the channel condition.

One option to enable ACK/NAK repetition is for NodeB to explicitly inform the UEs which ACK/NAK resource to use, via DL control channels or higher layer (e.g. RRC) signaling. The NodeB may also inform the UE of the ACK/NAK repetition factor N. The ACK/NAK repetition factor can be a UE-specific value, cell-specific value, NodeB specific value, or common to all UEs in the system. The ACK/NAK repetition factor may be provided to the UE via DL control channels or higher layer (e.g. RRC) signaling. Moreover, UE needs to know the time (e.g. in unit of subframes) instances to transmit the repeated ACK/NAK bits. In case the subframes to transmit the repeated ACK/NAK bits are in the consecutive subframes after the first ACK/NAK transmission, there is no additional signaling needed. It is possible for NodeB to configure the ACK/NAK resource for ACK/NAK repetition transmission such that different UEs can reuse the same ACK/NAK resource in different subframes.

When the coverage limited UE experiences better channel condition, it is not necessary for such UE to continue repeating ACK/NAK transmissions. NodeB can inform the UE that ACK/NAK repetition is no longer needed and the associated ACK/NAK resource for ACK/ANK repetition is released. Such signaling can be done via DL control channel or through higher layer signaling, e.g. RRC signaling.

Figure 1:
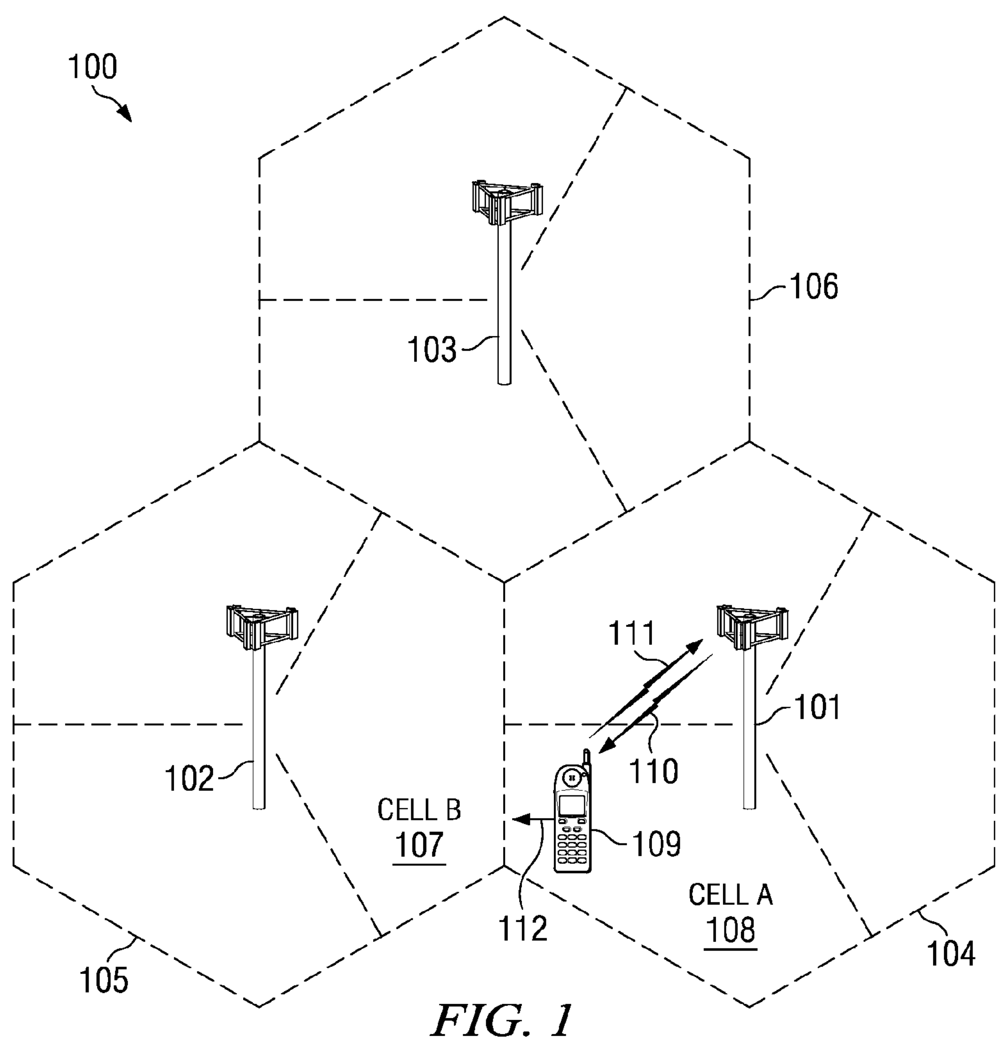
FIG. 1 is a pictorial of an illustrative telecommunications network that employs ACK/NAK repetition.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. A UE in a cell may be stationary such as within a home or office, or may be moving while a user is walking or riding in a vehicle. UE 109 moves within cell 108 with a velocity 112 relative to base station 102.

UE 109 uses an embodiment of ACK/NAK repetition described in more detail below for ACK/NAK transmissions on PUCCH to the serving NodeB, such as NodeB 101 while UE 109 is within cell 108.

Figure 2:
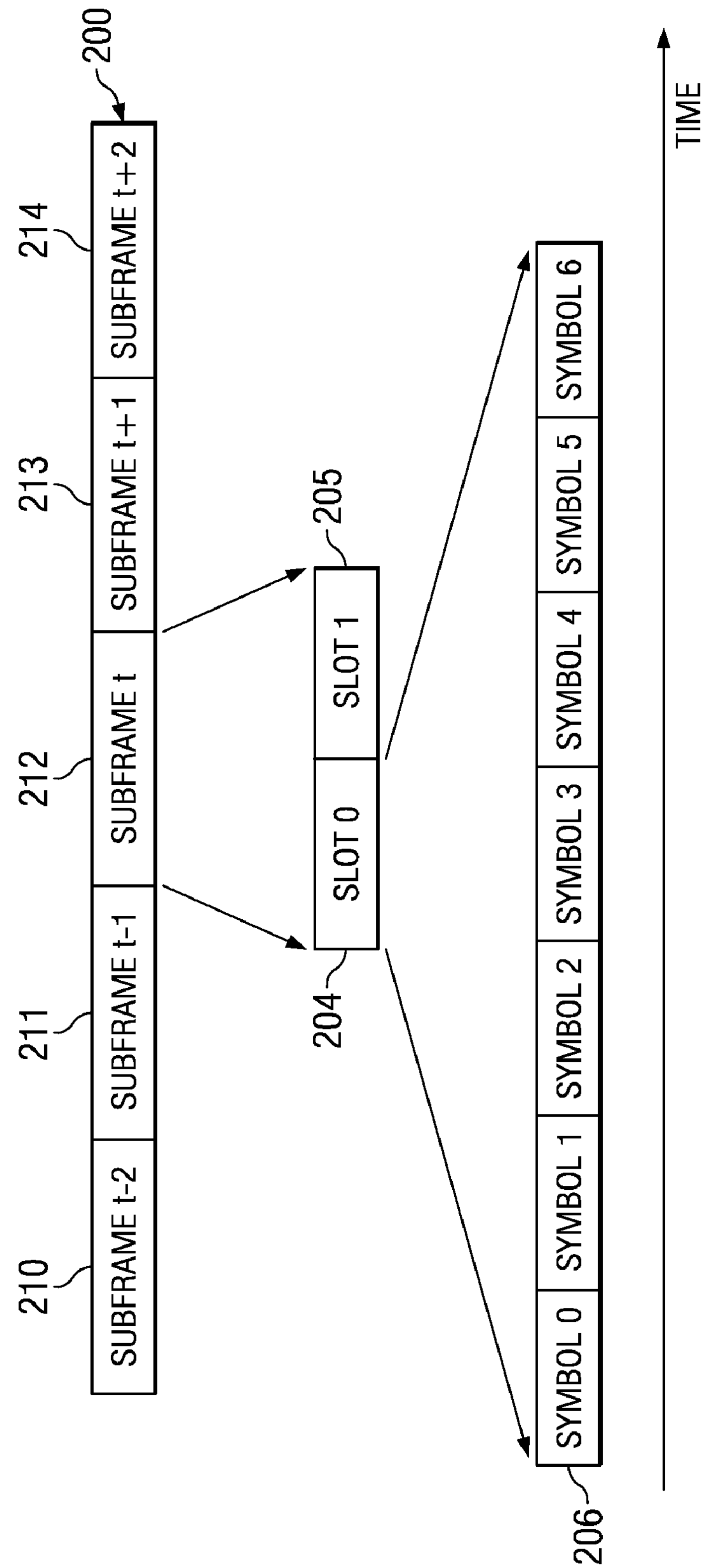
FIG. 2 illustrates an example frame structure for transmission of repeated ACK/NAK in the network of FIG. 1.

FIG. 2 is an example frame structure 200 for transmission of repeated ACK/NAK in the network of FIG. 1. Each frame 200 contains several subframes, as indicated generally at 210 to 214. In turn, each subframe, such as subframe 212 contains two slots 204, 205. Each slot contains a number of information carrying symbols, generally indicated at 206. A cyclic prefix (CP) field (not shown) is also appended to each symbol in order to improve reception integrity. In the current E-UTRA standard, each slot contains seven symbols 206 if a normal CP length is used or six symbols 206 if an extended CP length is used. Other embodiments of the invention may provide other frame structures than the exemplary frame structure illustrated in FIG. 2.

The repeated ACK/NAK bits can be transmitted in the consecutive (N−1) subframes following the first transmission of the ACK/NAK bits. For example, in the case where the repetition factor N is four, then a first ACK/NAK transmission may occur in subframe 210, and three repetitions of the ACK/NAK transmission may occur in subframes 211 to 213. Similarly, the first ACK/NAK transmission may occur in subframe 211 with three repetitions in subframes 212 to 214, etc. Alternatively, the repeated ACK/NAK bits can be transmitted in non-consecutive subframes after the first transmission of the ACK/NAK bits.

For PUCCH, a cyclically shifted or phrase ramped CAZAC-like sequence is transmitted in each symbol. Different cyclic shifts or different amounts of phrase ramping can be used to multiplex more than one UE's PUCCH transmission in the same physical resource block. A resource block in 3GPP E-UTRA is defined as 12 consecutive resource elements in frequency domain, wherein each resource element is of 15 kHz. For ACK/NAK transmission, additional orthogonal covering can be applied across the symbols in the time domain, thereby increasing the ACK/NAK multiplexing up to 36 UEs per PUCCH resource block. However, due to spillover between consecutive cyclic shifts, it is recommended that not all 12 cyclic shifts are utilized.

In each OFDM symbol, a cyclically shifted or phase ramped CAZAC-like sequence is transmitted. The CAZAC-like sequence in an RS OFDM symbol is un-modulated. The CAZAC-like sequence in a data OFDM symbol is modulated by the data symbol. Here the data symbol can be the ACK/NAK symbol, SRI symbol, Rank Indicator (RI) symbol, or CQI symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n)=e^{j\phi(n)\pi/4}, 0\leq n\leq M_{SC}^{RS}-1$$

where $M_{SC}^{RS}=12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

TABLE 1

| Definition of φ(n) | | | | | | | | | | | | |
|---|---|---|---|---|---|---|---|---|---|---|---|---|
| u | φ(0), . . . , φ(11) | | | | | | | | | | | |
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

The frame structure used in the PUSCH is similar to that illustrated in FIG. 2. Each resource block (RB) in PUSCH contains twelve resource elements, each of which covers a 15 kHz portion of the frequency spectrum. However, CDM is not employed in the PUSCH.

Figure 3:
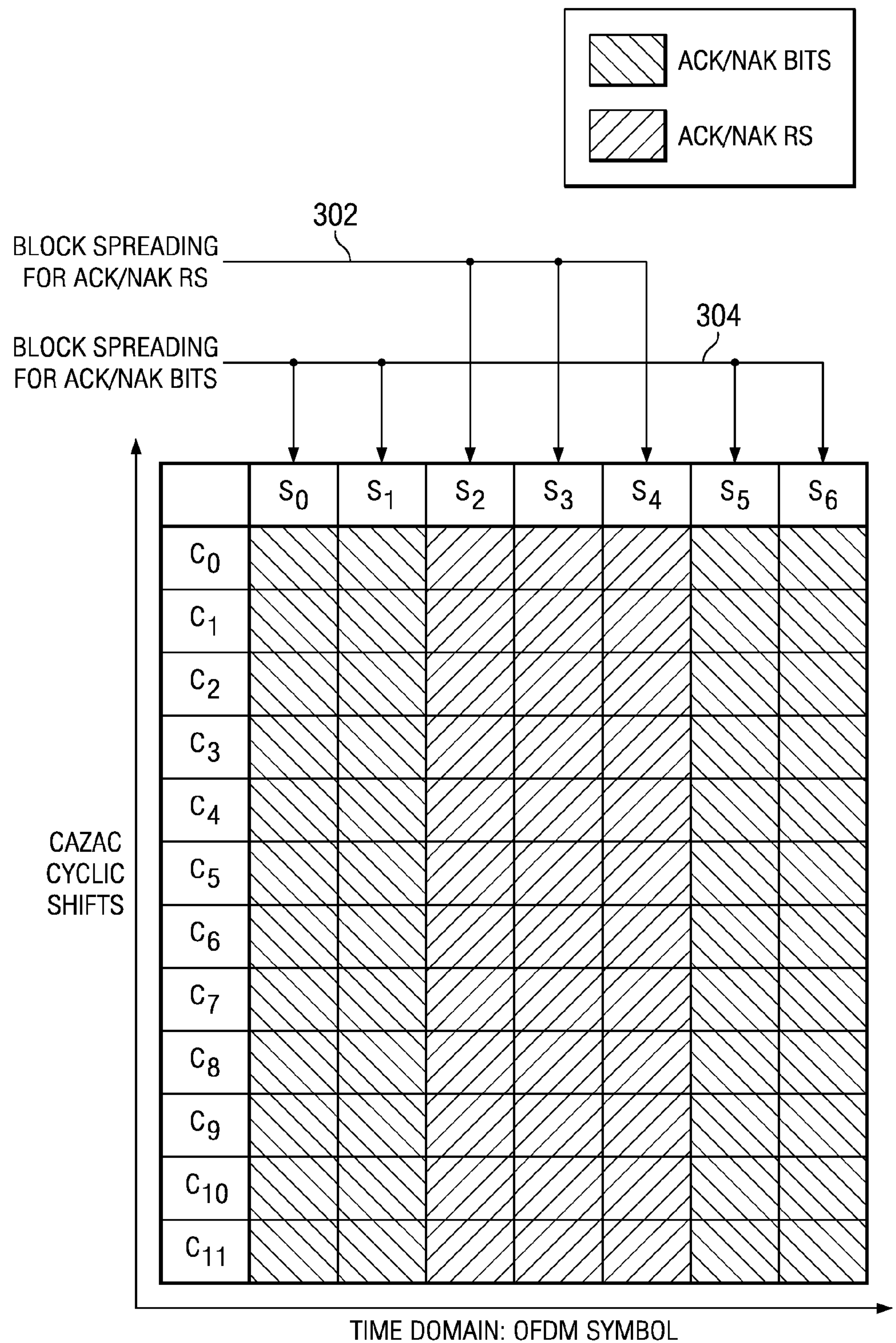
FIG. 3 illustrates an orthogonal structure that supports transmission of ACK/NAK by multiple users within the same frequency and time resource.

FIG. 3 illustrates an orthogonal structure that supports transmission of ACKNAK on PUCCH by multiple users within the same frequency and time resource. FIG. 3 illustrates one slot of a transmission frame in which a normal cyclic prefix (CP) is used, where $c_0$ to $c_{11}$ represent the cyclic shifts of a CAZAC-like sequence, and $S_0$ to $S_6$ represent seven OFDM symbols per slot (0.5 ms). Without loss of generality, the middle three OFDM symbols $S_2$ to $S_4$ are assumed to carry the reference signal (RS) for coherence demodulation, while the other four OFDM symbols carry the data information. Orthogonal covering 302 and 304, also known as block spreading or other similar terms, is applied to the RS OFDM symbols and the data bearing OFDM symbols, respectively. The data bearing OFDM symbols can be binary phase shift keying (BPSK) modulated, quadrature phase shift keying (QPSK) modulated, or ON-OFF keying modulated. In other embodiments, the RS and/or the data bearing symbols may be transmitted without the use of orthogonal covering. In other embodiments, the number of RS symbols and their positions may be varied.

Similarly, in one slot of a transmission frame in which an extended cyclic prefix (CP) is used there are only six symbols available per slot (0.5 ms). The middle two OFDM symbols are assumed to carry the reference signal (RS) for coherence demodulation, while the other four OFDM symbols carry the data information. Orthogonal covering is applied to the RS OFDM symbols and the data bearing OFDM symbols, respectively. The data bearing OFDM symbols are BPSK modulated, QPSK modulated, or ON-OFF keying modulated.

In another embodiment, CS0-CS11 represent 12 different amounts of phase ramping applied to a root CAZAC-like sequence. A cyclic shifted sequence is obtained by a cyclic shift operation on the root sequence, which is typically defined in the time domain. A phase ramped sequence is obtained by a phase ramping operation on the root sequence, which is typically defined in the frequency domain. The proposed method in this disclosure applies to both cyclic shifted sequences and phase ramped sequences.

To increase the ACK/NAK multiplexing capacity, block spreading is applied to the RS OFDM symbols and ACK/NAK bearing OFDM symbols, respectively. For example, the RS OFDM symbols are covered by block spreading codes 302 of length three, while the ACK/NAK bearing OFDM symbols are covered with block spreading codes 304 of length four.

Figure 4:
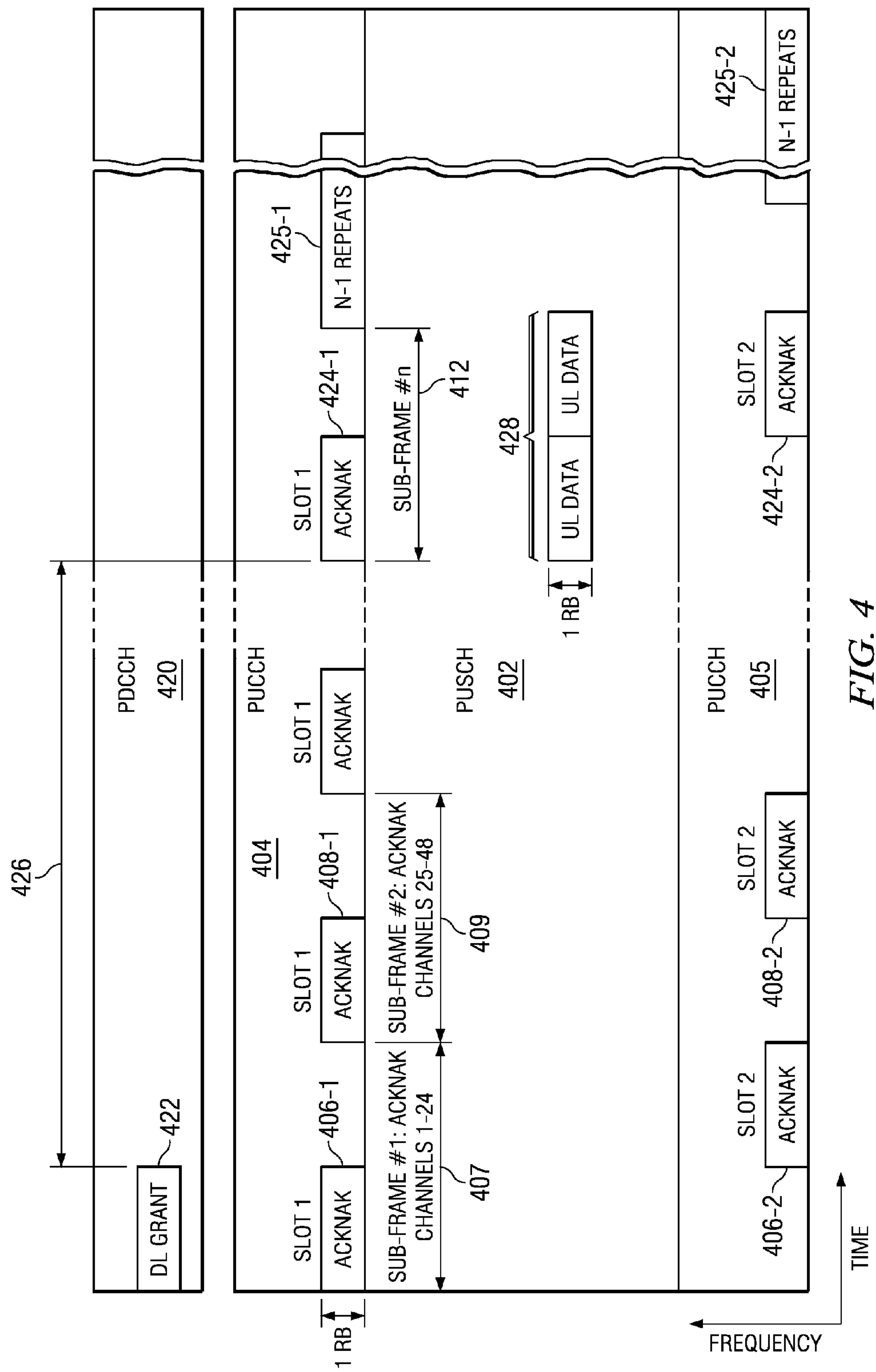
FIG. 4 is an illustration of repeated transmission of ACK/NAK symbols using the orthogonal structure of FIG. 2.

FIG. 4 is frequency vs. time plot illustrating PUCCH 404, 405 and PUSCH 402, with ACKNAK transmitted on the PUCCH using a cyclic shifted or phrase ramped CAZAC-like sequence as described above. Each ACK/NAK channel can be defined as a combination of a cyclic shifted or phrase ramped CAZAC-like sequence, and an orthogonal covering sequence. The ACKNAK channels are allocated on one or more resource blocks of the physical uplink control channel (PUCCH). FIG. 4 shows an example where at most twenty-four ACK/NAK channels can be multiplexed in one PUCCH RB, as indicated generally at 407. The next sequential sub-frame is indicated at 408 and can likewise support up to twenty-four ACK/NAK channels in one PUCCH RB. Within a sub-frame, the PUCCH resource used for ACK/NAK transmission hops at both edges of the system bandwidth on a slot basis. Each slot represents one-half of a subframe. For example, an ACKNAK transmission in slot 406-1 of subframe 407 is in the higher frequency edge 404 and the ACKNAK transmission in slot 406-2 of subframe 407 is in the lower frequency edge 405 of the PUCCH. Similarly, slots 408-1, 408-2 carry the next set of twenty-four ACK/NAK channels in subframe 409. In general, ACKNAK sequences in the first and the second slot are the same, but they may be different in some embodiments. Note that although FIG. 4 shows an example where a maximum of 24 ACK/NAK channels exist in one PUCCH resource block in a subframe, the number of UEs transmitting ACK/NAK in the PUCCH RB can be less than 24, since typically not all ACK/NAK channels are used in a subframe.

Occasionally, the NodeB that is serving a particular UE may determine that transmissions of ACKNAK signals from that UE are being interfered with by other UEs in the same cell, or in the neighboring cells, or by other factors. Since CDM is employed in the PUCCH, due to intra-cell interference, a signal from a UE that is at the edge of the cell may be over-powered by other UE that are being multiplexed onto the same resource block but that are closer to the NodeB. In any of these cases, the NodeB may send a trigger signal to direct the affected UE to repeat its ACKNAK and possibly also its CQI feedback transmissions in order to improve reliability of the ACK/NAK feedback.

Referring again to FIG. 4, downlink grant 422 informs the UE of incoming data on a set of allocated resources on the downlink shared data channel. The ACKNAK response for the received data indicated by downlink grant 422 is first transmitted in slots 424-1, 424-2 of subframe 412 on the PUCCH. In case the UE is configured to repeat transmissions of ACK/NAK, and the number of repeated subframes for ACK/NAK transmission is defined by a repetition factor N, then the N−1 repetitions are illustrated generally at 425-1, 425-2. The UE will transmit the ACKNAK using the allocated PUCCH resources in a subframe which occurs a defined amount of time 426 after the DL grant 422 is received. In this embodiment, the delay time is four subframe time periods. In one embodiment, the ACK/NAK channel for the initial ACK/NAK transmission is the same as the ACK/NAK channel for repeated ACK/NAK transmission, wherein the ACK/NAK channel is explicitly signaled to the UE by the eNodeB. In another embodiment, the ACK/NAK channel for the initial ACK/NAK transmission is implicitly derived by the UE using the PDCCH control channel element index, and the ACK/NAK channel for the repeated ACK/NAK transmission is explicitly signaled to the UE by the eNodeB.

Without loss of generality, the ACK/NAK repetition factor is denoted as N. It is preferable that the repeated ACK/NAK bits are transmitted in the consecutive subframes following the first transmission of the ACK/NAK bits, to reduce the ACK/NAK decoding latency. The repetition factor N can be UE-specific. On the other hand, for a simple design of signaling, a common value of N is possible for all UEs.

In one embodiment, the NodeB explicitly informs the UE which ACK/NAK resource to use via higher layer (e.g. RRC) signaling. In other words, if a UE requires ACK/NAK repetition in uplink, NodeB informs the PUCCH resource (e.g. the ACK/NAK channel index) to the UE. If case the ACK/NAK repetition factor N is UE specific, the value of N also needs to be conveyed to the UE.

Once a UE obtains the information about the PUCCH resource in which it can repeat the transmission of ACK/NAK bits, the UE owns the assigned PUCCH resource for the N−1 subframes, following the subframe where the first transmission of the ACK/NAK bits occurs. NodeB can reassign the same PUCCH resource to different UEs who require ACK/NAK repetition, as long as these UEs transmit their own repeated ACK/NAK bits in different subframes. In addition, when the UE channel condition changes such that ACK/NAK repetition is no long required, NodeB can explicitly inform the UE to release the associated PUCCH resource for ACK/NAK repetition, via RRC signaling. Therefore, the resources for the transmission of repeated ACK/NAK bits can be efficiently utilized. Note the ACK/NAK transmission occurs in uplink. If the uplink subframes are not consecutive (e.g. as in TDD systems), then the repeated transmissions of the ACK/NAK shall occur in the next N−1 uplink subframes, following the subframes where the first transmission of the ACK/NAK bits occurs.

The proposed RRC configured ACK/NAK repetition is applicable to both dynamically and semi-persistently scheduled UEs. For the first transmission of ACK/NAK bits, dynamically scheduled UE can use the dynamic ACK/NAK channel, which is derived from the lowest CCE index of its DL grant. For semi-persistently scheduled UE, it can use the semi-persistent ACK/NAK channel for the first transmission of the ACK/NAK bit. In case the repeated ACK/NAK bits need to be transmitted with UL data, they can be transmitted on the assigned PUSCH RBs.

It is not precluded that the signaling of the PUCCH resource for the use of ACK/NAK repetition contains a special value. Upon receiving such a special value as the signaling of the PUCCH resource for the use of ACK/NAK repetition, UE implicitly derives the PUCCH resource for ACK/NAK repetition based on the PUCCH resource used for the initial ACK/NAK transmission. In one embodiment, the PUCCH resource for ACK/NAK repetition is the same as the PUCCH resource for the initial ACK/NAK transmission. In another embodiment, the PUCCH resource for ACK/NAK repetition is derived from the PUCCH resource for initial ACK/NAK transmission and a PUCCH resource index offset, wherein the offset can be fixed or dependent on the UE's PDCCH for the corresponding DL data packet being acknowledged by the ACK/NAK. It is not precluded that multiple such special values exist (as the signaling of PUCCH resource for the use of ACK/NAK repetition). If UE does not receive any of the special values in the signaling of PUCCH resource for the use of ACK/NAK repetition, it shall repeat the ACK/NAK transmission on the explicitly signaled PUCCH resource.

For UE with ACK/NAK repetition, in case it is scheduled in consecutive subframes for DL transmission, it may need to transmit multiple ACK/NAK bits (including some of repeated ACK/NAK bits) in a UL subframe. Transmitting multiple ACK/NAK bits in a subframe reduces the ACK/NAK detection performance, which contradicts the purpose of ACK/NAK repetition. NodeB scheduler can ensure that UEs with ACK/NAK repetition are not scheduled in consecutive subframes for DL transmission. Therefore, for a UE who is repeating ACK/NAK transmission in UL, once it receives a DL grant in a subframe, the UE does not search for DL grant in the next N−1 DL subframes, since the UE knows NodeB will not schedule transmission for it. On the other hand, the UE may still search for other control information (e.g. common DL control information, power control command, UL grant, etc.) in DL control channel (a.k.a. PDCCH in 3GPP LTE) in the next N−1 DL subframes.

Alternatively, if a UE with ACK/NAK repetition is scheduled in consecutive subframes for DL transmission, it can bundle or compress the multiple ACK/NAK bits corresponding to multiple DL subframes into one ACK/NAK bit. The bundled ACK/NAK bit is firstly transmitted in the ACK/NAK channel associated with the last detected DL subframe. After that the UE repeats the bundled ACK/NAK bits N−1 times in the ACK/NAK channel explicitly assigned for the transmission of repeated ACK/NAK bit. NodeB shall not schedule DL transmission for the UE, who is supposed to repeat the transmission of ACK/NAK bits.

It is not precluded that the first transmission of ACK/NAK bit can also occur in the ACK/NAK channel explicitly assigned for the transmission of ACK/NAK repetition.

Figure 5:
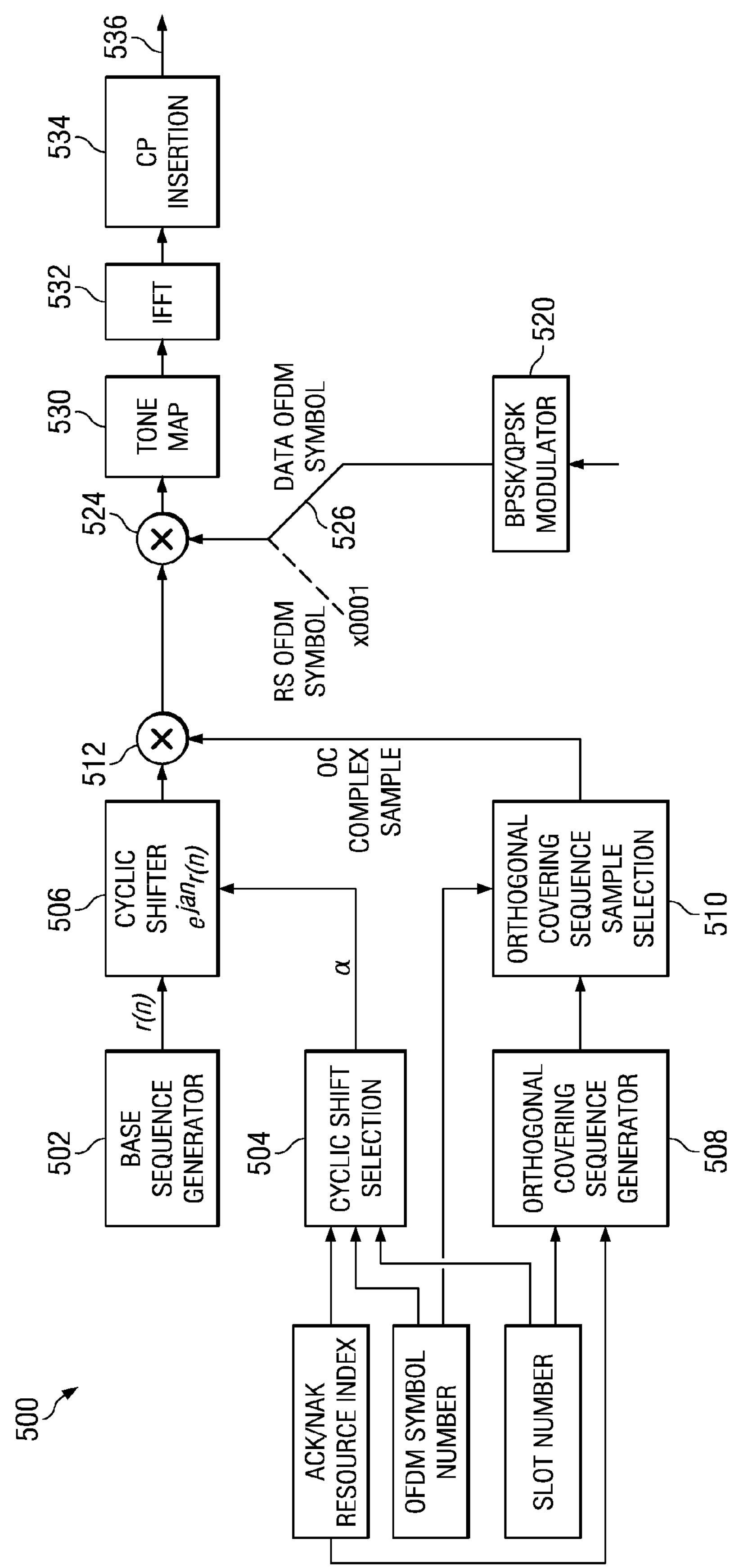
FIG. 5 is a block diagram of an illustrative transmitter for transmitting ACKNAK using the structures of FIG. 3.

FIG. 5 is a block diagram of an illustrative transmitter 500 for transmitting ACK/NAK using structures of FIGS. 2 to 4. Elements of the transmitter may be implemented as components in a fixed or programmable processor by executing instructions stored in memory. In other embodiments, the transmitter may be implemented as circuitry dedicated to use as a transmitter. The UE generates a CAZAC-like (e.g. ZC or extended ZC or zero-autocorrelation QPSK computer-generated) sequence using base sequence generator 502. A cyclic shift value is selected for each symbol by the cyclic shift selecting module 504, based on the ACK/NAK resource index, the OFDM symbol number and the slot number. The base sequence is then shifted by cyclic shifter 506 on a symbol by symbol basis using shift values provided by cyclic shift selection module 504.

The UE generates both RS and data orthogonal covering sequences 302 and 304, for example, using orthogonal sequence generator 508. The sequence length is equal to the number of covered OFDM symbols. The number of data OFDM symbols is four in the FIG. 2 example. Sequences used for this orthogonal covering are typically length-4 Walsh-Hadamard sequences, Orthogonal sequence generator 508 generates one sequence out of the set of orthogonal sequences based on the ACK/NAK resource index and the slot number.

The orthogonal covering sequence sample selection 510 selects and issues the appropriate sequence complex sample from the appropriate sequence (RS or data) based on the index of the OFDM symbol being currently generated.

The cyclic shifted base sequence vector is element-wise complex-multiplied by the selected orthogonal covering complex sample in complex multiplier 512.

The data is organized as either one or two bits in this embodiment and is input to modulator block 520. The data bearing OFDM symbols are binary phase shift key (BPSK) or quadrature phase shift key (QPSK) modulated when the data information is one or two bits wide, respectively. The switch 526 selects, based on the OFDM symbol type (data or RS), which of the modulation complex sample or "1" feeds the complex multiplier 524.

The result of the element-wise complex multiplication is mapped onto a designated set of tones (sub-carriers) using the Tone Map 530. The UE next performs IFFT of the mapped signal using the IFFT 532. A cyclic prefix is created and added in module 534 to form a final fully formed uplink signal 536.

Figure 6:
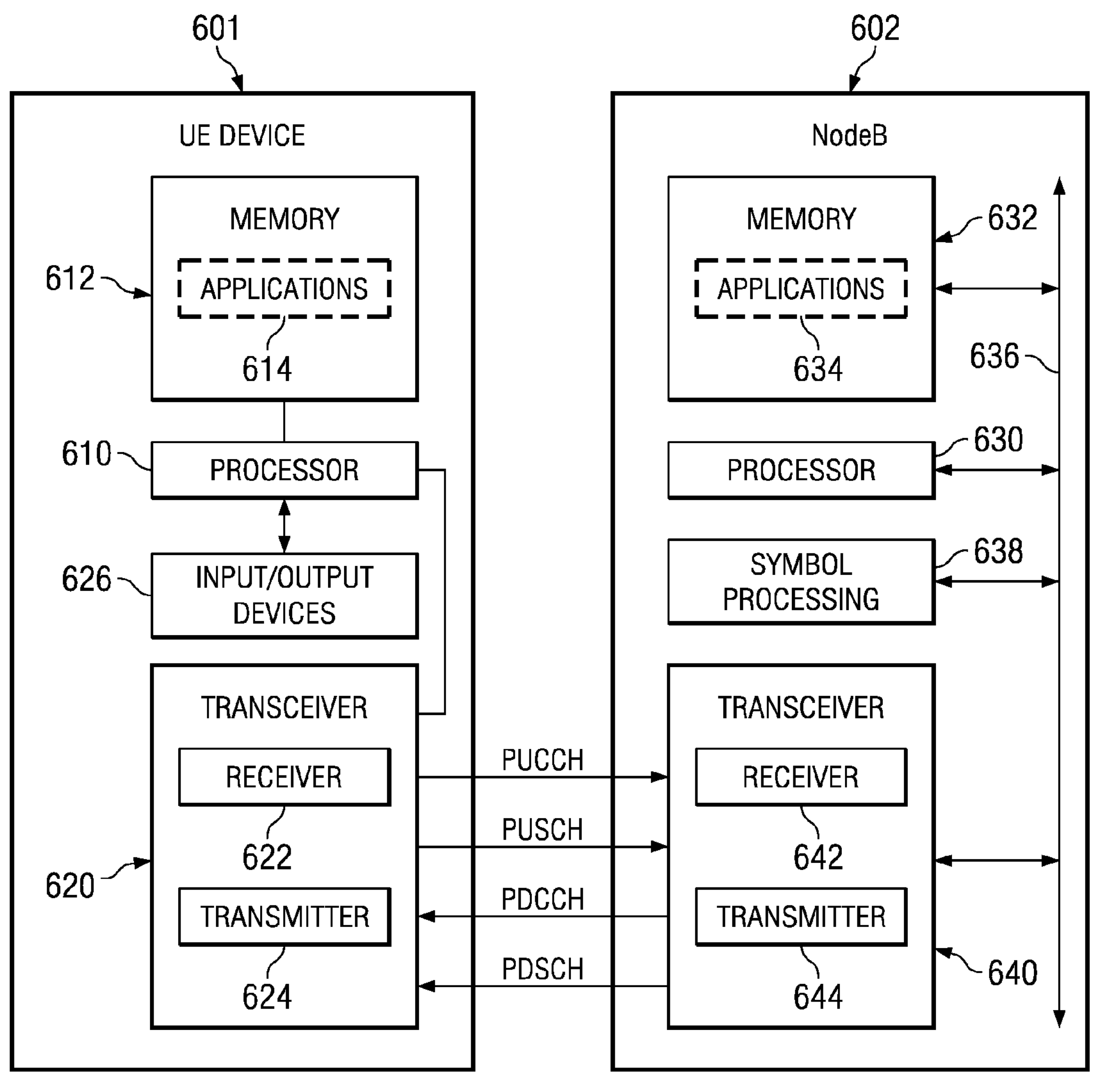
FIG. 6 is a block diagram of a Node B and a User Equipment for use in the network system of FIG. 1.

In order to perform ACK/NAK repetition, the process of forming the ACK/NAK transmission is repeated the number of times indicated by the repetition factor N using either the same resource or an alternative resource, as described in more detail above. As discussed above, the repeated ACK/NAK transmissions may occur in the consecutive (N−1) subframes following the first transmission of the ACK/NAK bits. Alternatively, the repeated ACK/NAK transmission can occur in non-consecutive subframes following the first transmission of the ACK/NAK bits FIG. 6 is a block diagram illustrating operation of a NodeB 602 and a mobile UE 601 in the network system of FIG. 1. The mobile UE device 601 may represent any of a variety of devices such as a server, a desktop computer, a laptop computer, a cellular phone, a Personal Digital Assistant (PDA), a smart phone or other electronic devices. In some embodiments, the electronic mobile UE device 601 communicates with the NodeB 602 based on a LTE or E-UTRAN protocol. Alternatively, another communication protocol now known or later developed can be used.

As shown, the mobile UE device 601 comprises a processor 610 coupled to a memory 612 and a Transceiver 620. The memory 612 stores (software) applications 614 for execution by the processor 610. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VoIP) tools, file browsers, firewalls, instant messaging, finance tools, games, word processors or other categories. Regardless of the exact nature of the applications, at least some of the applications may direct the mobile UE device 601 to transmit UL signals to the NodeB (base-station) 602 periodically or continuously via the transceiver 620. In at least some embodiments, the mobile UE device 601 identifies a Quality of Service (QoS) requirement when requesting an uplink resource from the NodeB 602. In some cases, the QoS requirement may be implicitly derived by the NodeB 602 from the type of traffic supported by the mobile UE device 601. As an example, VoIP and gaming applications often involve low-latency uplink (UL) transmissions while High Throughput (HTP)/Hypertext Transmission Protocol (HTTP) traffic can involve high-latency uplink transmissions.

Transceiver 620 includes uplink logic which may be implemented by execution of instructions that control the operation of the transceiver. Some of these instructions may be stored in memory 612 and executed when needed by processor 610. As would be understood by one of skill in the art, the components of the Uplink Logic may involve the physical (PHY) layer and/or the Media Access Control (MAC) layer of the transceiver 620. Transceiver 620 includes one or more receivers 622 and one or more transmitters 624.

Processor 610 may send or receive data to various input/output devices 626. A subscriber identity module (SIM) card stores and retrieves information used for making calls via the cellular system. A Bluetooth baseband unit may be provided for wireless connection to a microphone and headset for sending and receiving voice data. Processor 610 may send information to a display unit for interaction with a user of the mobile UE during a call process. The display may also display pictures received from the network, from a local camera, or from other sources such as a USB connector. Processor 610 may also send a video stream to the display that is received from various sources such as the cellular network via RF transceiver 622 or the camera.

During transmission and reception of voice data or other application data, transmitter 624 sends ACKNAK information via the PUCCH link to the serving NodeB 602, as described in more detail above using ACK/NAK repetition. In this embodiment, the ACK/NAK repetition scheme is embodied by executing instructions stored in memory 612 by processor 610. In other embodiments, the ACK/NAK repetition scheme may be embodied by a separate processor/memory unit, by a hardwired state machine, or by other types of control logic, for example.

The repeated ACKNAK signals are then transmitted by transmitter 624, as described in more detail with regard to FIG. 5.

NodeB 602 comprises a Processor 630 coupled to a memory 632, symbol processing circuitry 638, and a transceiver 640 via backplane bus 636. The memory stores applications 634 for execution by processor 630. The applications could comprise any known or future application useful for managing wireless communications. At least some of the applications 634 may direct the base-station to manage transmissions to or from the user device 601.

Transceiver 640 comprises an uplink Resource Manager, which enables the NodeB 602 to selectively allocate uplink PUSCH resources to the user device 601. As would be understood by one of skill in the art, the components of the uplink resource manager may involve the physical (PHY) layer and/or the Media Access Control (MAC) layer of the transceiver 640. Transceiver 640 includes a Receiver(s) 642 for receiving transmissions from various UE within range of the NodeB and transmitter(s) 644 for transmitting data and control information to the various UE within range of the NodeB.

The uplink resource manager executes instructions that control the operation of transceiver 640. Some of these instructions may be located in memory 632 and executed when needed on processor 630. The resource manager controls the transmission resources allocated to each UE that is being served by NodeB 602 and broadcasts control information via the physical downlink control channel PDCCH.

Symbol processing circuitry 638 performs demodulation using known techniques. ACKNAK information received from UE 601 is de-modulated using an agreed upon repetition scheme as described in more detail above. The specific repetition scheme that a given UE is to use may be communicated from the NodeB to the UE via a control transmission, using RRC signaling for example. Alternately, repetition parameters may be agreed upon and each UE in the network is configured accordingly in an offline manner, for example.

While transacting with UE 601, NodeB 602 may determine that feedback from UE 601 is being interfered with or otherwise distorted, as discussed above. NodeB 602 may then transmit to the UE an indication to repeat a type of feedback information, an allocation of resource S1 for use in uplink to repeat the feedback information, and an indication of a number N, wherein the repetition of the feedback information comprises N transmission instances. The NodeB may then transmit to the UE a block of data on a downlink shared data channel. In response, it will receive from the UE the feedback information repeated N times using the allocated uplink resource S1, wherein the feedback information is either a positive acknowledgement when the transmitted block of data is decoded correctly by the UE or a negative acknowledgement when the block of data is decoded incorrectly by the UE.

In another embodiment, the NodeB may transmit to the UE an allocation of resources for a downlink shared data channel through a downlink control channel, wherein the allocation of resources implies an uplink resource S2. It then transmits to the UE a block of data on the allocated downlink shared data channel. In response, it receives from the UE the feedback information once using the allocated uplink resource S2 and repeated N−1 times using the allocated uplink resource S1, wherein the feedback information is either a positive acknowledgement when the transmitted block of data is decoded correctly by the UE or a negative acknowledgement when the block of data is decoded incorrectly by the UE. In this embodiment, receiving the feedback information using uplink resource S2 occurs in the first of the N consecutive uplink subframes; and receiving the feedback information N−1 times using the uplink resource S1 occur in the last N−1 subframes of the N consecutive uplink subframes.

Another Embodiment: Higher Order Modulation

It is possible for a coverage-limited UE to transmit multiple ACK/NAK bits in one subframe, including some repeated ACK/NAK bits from earlier transmission. One option is to employ higher order modulation to transmit the multiple ACK/NAK bits. The ACK/NAK channel to transmit the multiple ACK/NAK bits can be one of the dynamical ACK/NAK resources for dynamically scheduled UEs, or the semi-persistent ACK/NAK resource for semi-persistently scheduled UEs, or the repetition ACK/NAK resource.

In detail, when the UE is dynamically scheduled and it is assigned ACK/NAK repetition resources, in case the UEs has multiple ACK/NAK bits (including repeated ACK/NAK bits) to transmit in one subframe, the UE can transmit the multiple ACK/NAK in the dynamic ACK/NAK channel linked to the lowest CCE index in its PDCCH, by higher order modulation (e.g. QPSK, 8PSK, etc). Alternatively, the dynamically scheduled UE can transmit the multiple ACK/NAK bits in the repetition ACK/NAK resource, by higher order modulation (e.g. QPSK, 8PSK, etc).

For semi-persistently scheduled UE, if the UE has multiple ACK/NAK (including repeated ACK/NAK bits) bits to transmit, it can transmit the multiple ACK/NAK bits on its semi-persistently scheduled ACK/NAK resource, by higher order modulation (e.g. QPSK, 8PSK, etc). Alternatively, the semi-persistently scheduled UE can transmit the multiple ACK/NAK bits in the repetition ACK/NAK resource.

On the other hand, for coverage limited UEs who are dynamically scheduled, it is common that its PDCCH consists of multiple CCEs. By the implicit mapping between CCEs and UL ACK/NAK resources, it is therefore possible for such UE to have multiple dynamic ACK/NAK resources. In such cases, the UE can transmit the multiple ACK/NAK bits by the combined method of channel selection and QAM modulation.

In essence, when UE needs to transmit multiple ACK/NAK bits (includes several repeated ACK/NAK bits) and the UE has multiple ACK/NAK channels (including dynamic ACK/NAK channels, semi-persistent ACK/NAK channels, and ACK/NAK channels assigned for the transmission of repeated ACK/NAK bits), the UE selects a subset (possibly all) of ACK/NAK bits to perform ACK/NAK channel selection. On the selected ACK/NAK channel, the UE transmits the remaining ACK/NAK information bits by QAM (e.g. BPSK, QPSK).

Alternatively, NodeB scheduler can make sure that for cell-edge UEs (who need to repeat the ACK/NAK transmission), there is no such occasion that a UE needs to transmit multiple ACK/NAK bits in one subframe.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

While the invention has been described with reference to ACK/NAK information, it is not precluded that the described repetition schemes can be applied to other feedback information. Such feedback information includes but not limited to channel quality indicator, rank indicator, scheduling request indicator.

While a maximum of thirty-six potential channels are defined in the present embodiments for one resource block, not all thirty six channels are used simultaneously. In another embodiment the size of a resource block and the resultant number of potential channels may be increased or decreased.

In another embodiment, In case the repeated ACK/NAK bits need to be transmitted with UL data, they can be transmitted on the PUSCH using a set of resource blocks or resource elements allocated by an uplink grant. In this case, referring again to FIG. 4, the first ACK/NAK and other data is transmitted in PUSCH resource subframe 428 and N−1 ACK/NAK repetitions are transmitted thereafter in allocated RBs on PUSCH. As discussed above, the repeating subframes may be contiguous with the first ACK/NAK subframe, or they may be spaced apart. The UE will transmit the ACKNAK using the allocated PUSCH resources in a subframe which occurs a defined amount of time 426 after the UL grant is received. In this embodiment, the delay time is four subframe time periods. In another embodiment, some field(s) in the UL grant can be the trigger to indicate whether UE shall repeat transmission ACK/NAK on the allocated PUSCH resources.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for providing feedback information in a wireless communication system, comprising:

receiving an indication to repeat a type of feedback information;

receiving an allocation of resource S1 in uplink for use to repeat the feedback information;

receiving an indication of a number N, wherein the transmission of the feedback information comprises N transmission instances;

receiving an allocation of resources for a downlink shared data channel through a downlink control channel;

receiving a block of data on the allocated downlink shared data channel;

decoding the received data;

generating either a positive acknowledgement when the received data is decoded correctly or a negative acknowledgement when the data is decoded incorrectly as the feedback information;

deriving an uplink resource S2 for transmission of the feedback information using the downlink control channel information;

transmitting the feedback information once using the uplink resource S2; and transmitting the feedback information N−1 times using the uplink resource S1.

2. The method of claim 1, wherein the transmission of the feedback information occurs in N consecutive uplink subframes.

3. The method of claim 2, wherein transmitting the feedback information using uplink resource S2 occurs in the first of the N consecutive uplink subframes; and wherein transmitting the feedback information N−1 times using the uplink resource S1 occur in the last N−1 subframes of the N consecutive uplink subframes.

4. An apparatus for use in a wireless network, comprising:

processing circuitry coupled to receiver circuitry and to transmitter circuitry;

wherein the receiver circuitry is operable to receive an indication to repeat a type of feedback information, an allocation of resource S1 in uplink for use to repeat the feedback information, and an indication of a number N, wherein the transmission of the feedback information comprises N transmission instances;

wherein the processing circuitry is operable to generate the feedback information;

wherein the transmitting circuitry is operable to transmit the feedback information in M transmission instances using the allocated uplink resource S1, where $1 \leqq M \leqq N$;

the receiver circuitry is further operable to receive an allocation of resources for a downlink shared data channel through a downlink control channel, and to receive a block of data on the allocated downlink shared data channel;

the processing circuitry is further operable to decode the received data and to generate as the feedback information either a positive acknowledgement when the received data is decoded correctly or a negative acknowledgement when the data is decoded incorrectly, and further operable to derive an uplink resource S2 for transmission of the feedback information using the downlink control channel information; and the transmitter circuitry is further operable to transmit the feedback information once using the uplink resource S2 and to transmit the feedback information N−1 times using the uplink resource S1.

5. The apparatus of claim 4, wherein the feedback information is transmitted using uplink resource S2 in the first of N consecutive uplink subframes, and the feedback information is transmitted N−1 times using the uplink resource S1 in the last N−1 subframes of the N consecutive uplink subframes.

6. The apparatus of claim 4 being a cellular telephone.

7. A method for receiving feedback in a wireless communication system, comprising:

determining a user equipment (UE) should repeat feedback information;

transmitting to the UE an indication to repeat a type of feedback information;

transmitting to the UE an allocation of resource S1 for use in uplink to repeat the feedback information;

transmitting to the UE an allocation of resources for a downlink shared data channel through a downlink control channel, wherein the downlink control channel implies an uplink resource S2;

transmitting to the UE a block of data on the allocated downlink shared data channel; and receiving from the UE the feedback information once using the allocated uplink resource S2 and N−1 times using the allocated uplink resource S1, wherein the feedback information is either a positive acknowledgement when the transmitted block of data is decoded correctly by the UE or a negative acknowledgement when the block of data is decoded incorrectly by the UE.

8. The method of claim 7, wherein the reception of the feedback information occurs in N consecutive uplink subframes.

9. The method of claim 8, wherein receiving the feedback information using uplink resource S2 occurs in the first of the N consecutive uplink subframes; and wherein receiving the feedback information N−1 times using the uplink resource S1 occur in the last N−1 subframes of the N consecutive uplink subframes.

* * * * *